US010516973B2

(12) United States Patent
Makhija et al.

(10) Patent No.: US 10,516,973 B2
(45) Date of Patent: Dec. 24, 2019

(54) METHOD OF PROVIDING SEAMLESS RECEPTION OF BROADCAST SERVICE IN UE

(71) Applicant: Samsung Electronics Co., Ltd., Gyeonggi-do (KR)

(72) Inventors: Piyush Makhija, Bangalore (IN); Tariq Siddiqui, Bangalore (IN); Vinay Kumar Shrivastava, Bangalore (IN); Shrinath Ramamoorthy Madhurantakam, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 290 days.

(21) Appl. No.: 15/351,969

(22) Filed: Nov. 15, 2016

(65) Prior Publication Data

US 2017/0366947 A1    Dec. 21, 2017

(30) Foreign Application Priority Data

Jun. 15, 2016  (IN) .............................. 201641020473

(51) Int. Cl.
  *H04W 4/06*  (2009.01)
  *H04W 24/10*  (2009.01)
  *H04W 72/00*  (2009.01)

(52) U.S. Cl.
  CPC ............. *H04W 4/06* (2013.01); *H04W 24/10* (2013.01); *H04W 72/005* (2013.01)

(58) Field of Classification Search
  None
  See application file for complete search history.

(56) References Cited

U.S. PATENT DOCUMENTS

| 8,750,179 B2 | 6/2014 | Purnadi et al. |
| 2003/0211855 A1* | 11/2003 | Sarkkinen ........... H04W 72/005 455/466 |
| 2011/0217961 A1 | 9/2011 | Kameno et al. |
| 2013/0044668 A1 | 2/2013 | Purnadi et al. |

(Continued)

FOREIGN PATENT DOCUMENTS

| WO | WO 2014/065998 | 5/2014 |
| WO | WO 2015/140611 | 9/2015 |

OTHER PUBLICATIONS

3rd Generation Partnership Project; Technical Specification Group Services and System Aspects; Multimedia Broadcast/Multicast Service (MBMS); Architecture and Functional Description (Release 13), 3GPP TS 23.246 V13.3.0, Dec. 2015, 4 pages.

(Continued)

*Primary Examiner* — Chirag G Shah
*Assistant Examiner* — Srinivasa R Reddivalam
(74) *Attorney, Agent, or Firm* — The Farrell Law Firm, P.C.

(57) ABSTRACT

A method of providing seamless reception of multimedia broadcast multicast services (MBMS) in a user equipment (UE) having multiple radio frequency (RF) terminals is provided. The method includes receiving MBMS from a primary cell (P-Cell) through a first RF terminal in the UE, receiving a command through the first RF terminal while receiving the MBMS configuring the MBMS on a second RF terminal and receiving the MBMS from a non-primary cell wherein the non-primary cell includes at least one of a secondary cell and a non-serving cell.

20 Claims, 8 Drawing Sheets

(56) References Cited

U.S. PATENT DOCUMENTS

| | | | | |
|---|---|---|---|---|
| 2014/0119265 A1* | 5/2014 | Shauh | ............... | H04W 4/06 |
| | | | | 370/312 |
| 2015/0043533 A1* | 2/2015 | Kim | ............... | H04W 48/20 |
| | | | | 370/331 |
| 2016/0119822 A1* | 4/2016 | Chimmapudi | ........ | H04W 24/04 |
| | | | | 370/217 |
| 2016/0337817 A1* | 11/2016 | Malladi | ............ | H04W 4/06 |
| 2017/0034753 A1* | 2/2017 | Yang | ............... | H04W 36/36 |

OTHER PUBLICATIONS

German Search Report dated Feb. 15, 2018 issued in counterpart application No. 102017112920.0, 7 pages.

\* cited by examiner

METHOD OF PROVIDING SEAMLESS RECEPTION OF BROADCAST SERVICE IN UE

PRIORITY

This application claims priority under 35 U.S.C. § 119(a) to Indian Complete Patent Application Serial No. 201641020473 (CS), which was filed on Jun. 15, 2016, in the Indian Intellectual Property Office, the entire disclosure of which is incorporated herein by reference.

BACKGROUND

1. Field of the Disclosure

The present disclosure generally relates to broadcast services, and more particularly, to a method of providing seamless reception of broadcast services in a user equipment (UE).

2. Description of the Related Art

Multimedia broadcast multicast services (MBMS) in long term evolution (LTE) is a type of service which provides both multicast and broadcast services to multiple users within an area or cell. In broadcast mode, MBMS does not require an uplink connection and may be used as a downlink-only broadcast technology. MBMS allows simultaneous usage of broadcast/multicast voice and data services. This provides flexibility to cellular operators. MBMS allows delivery of multimedia using a minimum of spectral resources. In an example scenario, during broadcast of sporting events, public speeches, news, multicasting of popular videos, software distribution by multicast, and the like, MBMS provides multimedia services to multiple UEs, located in a cell or area. The cost of utilization of spectral or other resources incurred by an individual user using MBMS is much less than the cost incurred when the same resources are individually utilized. MBMS also prevents wasting resources, by allocating common resources to multiple users utilizing the same services.

The different MBMS transmissions from different cells in a service area are synchronized and transmitted over the same frequency in a network. Thus, MBMS is also referred as a single frequency network (SFN) which reduces bandwidth consumption. The MBMS-SFN transmission is received from a service or content provider by different UEs in a service area which simulates a point to point connection between the service or content providers and UEs. The MBMS broadcast mode may be used to deliver data to all UEs in a certain area or the whole network. If the MBMS broadcast mode is used, a transmission bearer is setup in all cells for broadcasting a particular event or media content. The transmission bearer provides uninterrupted MBMS as long as the event takes place. The services provided by MBMS include streaming services, file download services, and the like. MBMS is capable of, streaming high quality audio and video, and allows faster download of audio and video files.

In the existing scenario, there may be interruptions in reception of MBMS transmissions during events such as an incoming call, flight mode enablement, handoff procedure, redirection procedure, reselection procedure, measurement gap, and the like. During these events, a user is not able to access MBMS transmissions. In an example scenario, a user is viewing a sporting event through MBMS using LTE, and a circuit switched fallback (CSFB) call arrives. In such a situation, the network switches the UE to a 2G/3G network from LTE. As a result, MBMS reception is interrupted until the CSFB procedure is completed. Similarly, in flight mode, reception of MBMS is interrupted due to disabling the transmitter and receiver in the UE. This creates an undesirable user experience. Thus, there is a requirement for having a method which may provide seamless connectivity for uninterrupted reception of MBMS.

SUMMARY

Accordingly, an aspect of the present disclosure provides a method of seamless reception of multimedia broadcast multicast services (MBMS) in a user equipment (UE).

In accordance with another aspect of the present disclosure, a method is provided of receiving MBMS from a primary cell (P-Cell), through a first radio frequency (RF) terminal, using a UE having multiple RF terminals.

In accordance with another aspect of the present disclosure, a method is provided of receiving a command through the first RF terminal, while receiving the MBMS.

In accordance with another aspect of the present disclosure, a method is provided of configuring the MBMS on a second RF terminal, to continue receiving the MBMS from a non-primary cell, in which the non-primary cell corresponds to either a secondary cell or a non-serving cell.

In accordance with another aspect of the present disclosure, after receiving a command such as CSFB, mobility, and the like, the cell associated with the 1st RF terminal is referred to as primary cell and the cell associated with the 2nd RF is referred to as a non-primary cell.

In accordance with another aspect of the present disclosure, a method is provided for uninterrupted reception of MBMS during arrival of a mobile originating (MO) or a mobile terminating (MT) CSFB calls respectively.

In accordance with another aspect of the present disclosure, a method is provided for seamless and glitch-free reception of MBMS through the second RF terminal, while discontinuous reception (DRX) measurements, handover, redirection, cell selection/reselection, measurement gap, reception of public broadcast messages, and the like are performed through the first RF terminal.

In accordance with another aspect of the present disclosure, a method is provided for parallel reception of MBMS and critical public safety information, broadcasted by the network during an emergency. Some examples of such emergency communications services are earthquake tsunami warning system (ETWS), cell broadcast (ETWS), mission critical push to talk (MC-PTT), group communication system enabler (GCSE) as well as vehicular communication messaging like cooperative awareness message (CAM), decentralized environmental notification message (DENM), etc.

In accordance with another aspect of the present disclosure, a method is provided for storage of MBMS commands received from an application, used for decoding MBMS in the UE, through an application interface during the CSFB procedure.

In accordance with another aspect of the present disclosure, a method is provided to allow execution of the stored latest/updated commands once an LTE stack is re-initialized after the termination of CSFB procedure.

In accordance with another aspect of the present disclosure, a method is provided to allow a user to seamlessly receive MBMS, even in situations in which it is recommended to turn off the UE.

In accordance with another aspect of the present disclosure, a method is provided to allow a user to receive MBMS without receiving CSFB calls, text messages, e-mail messages, notifications, and the like.

In accordance with an aspect of the present disclosure, a method is provided for providing seamless reception of multimedia broadcast multicast services (MBMS) in a user equipment (UE), having multiple radio frequency (RF) terminals. The method includes receiving MBMS from a primary cell (P-Cell), through a first RF terminal in the UE, receiving a command through the first RF terminal, while receiving the MBMS, configuring the MBMS on a second RF terminal to continue receiving the MBMS from a non-primary cell, wherein the non-primary cell corresponds to either a secondary cell or a non-serving cell.

In accordance with an aspect of the present disclosure, a method is provided for seamless reception of MBMS in a UE. The method includes configuring the second RF terminal with the P-Cell parameters, used for receiving the MBMS, in response to the reception of the command, performing the command procedure on the P-Cell through the first RF terminal in the UE, initiating transition from the first RF terminal to the second RF terminal, receiving packets through the first RF terminal and the second RF terminal during the initiation, determining duplicates in the packets received through the first RF terminal and the second RF terminal, deleting the duplicates in received packets post-determination, and determining that the characteristics of the signal received through the first RF terminal are greater than a pre-determined threshold associated with the characteristics of the signal.

In accordance with an aspect of the present disclosure, a method is provided for seamless reception of MBMS in a UE. The method includes receiving MBMS from a P-Cell, through a RF terminal in the UE, receiving a CSFB command through the RF terminal, while receiving the MBMS, de-configuring the MBMS being received through the RF terminal and initiating the CSFB procedure, determining that MBMS commands are received from an application interface in the UE, processing the stored MBMS commands after completion of the CSFB procedure and resuming the MBMS on the P-Cell.

In accordance with an aspect of the present disclosure, a method is provided for seamless reception of MBMS in a UE. The method includes receiving a command, indicating turning OFF transmission from the UE, turning OFF unicast reception from a network and enabling only broadcast reception from the network and receiving MBMS through an RF terminal.

BRIEF DESCRIPTION OF DRAWINGS

The above and other aspects, features, and advantages of the present disclosure will be more apparent from the following detailed description, taken in conjunction with the accompanying drawings in which.

DETAILED DESCRIPTION

Figure 1:
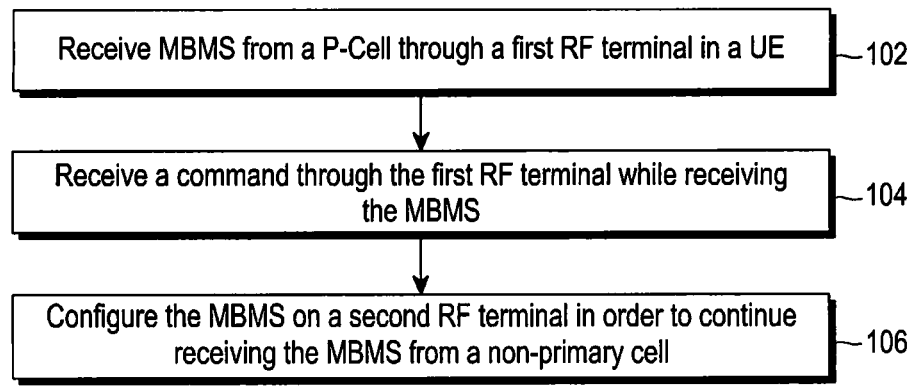
FIG. 1 is a flowchart depicting a method of providing seamless reception of MBMS in a UE having multiple RF terminals, according to an embodiment of the present disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

The present method allows seamless reception of broadcast services. However, the description below is focused on a method of providing seamless reception of MBMS.

According to an embodiment of the present disclosure, a method is provided for seamless reception of multimedia broadcast multicast services (MBMS) in a user equipment (UE), having multiple radio frequency (RF) terminals. The method includes receiving MBMS from a primary cell (P-Cell), through a first RF terminal in the UE, receiving a command through the first RF terminal, while receiving the MBMS, configuring the MBMS on a second RF terminal, to continue receiving the MBMS from a non-primary cell, wherein the non-primary cell corresponds to one of a secondary cell, and a non-serving cell, configuring the second RF with the P-Cell parameters, used for receiving the MBMS, in response to the reception of the command, performing the command procedure on the P-Cell through the first RF terminal in the UE, initiating transition from the first RF terminal to the second RF terminal, receiving packets through the first RF terminal and the second RF terminal during the initiation, determining duplicates in the packets received through the first RF terminal and the second RF terminal during transition, deleting the duplicates in received packets post-determination, determining that the characteristics of the signal received through the first RF terminal are greater than a pre-determined threshold, associated with the characteristics of the signal, and if the characteristics of the signal such as signal strength and signal quality, received from the P-Cell, is above a pre-defined threshold then MBMS reception from P-Cell is resumed, otherwise, the MBMS reception is continued from the non-primary cell through the second RF terminal.

According to an embodiment of the present disclosure, a method is provided for uninterrupted reception of MBMS in an event of reception of a command. In an example scenario, the command may be a CSFB call, handover, cell selection/reselection, discontinuous reception (DRX), measurements, and the like. In a UE having multiple RF terminals, wherein MBMS is being received from the P-Cell through the first RF terminal, upon reception of a particular command, the present method allows MBMS reception from a non-primary cell through the second RF terminal. The method allows seamless and glitch-free reception of MBMS.

In order to receive MBMS from the non-primary cell, it is necessary to configure the second RF terminal with P-Cell parameters, which were used for receiving MBMS through the first RF terminal prior to reception of the command. The present method ensures that the second RF terminal is configured with P-Cell parameters and MBMS reception is initiated from the non-primary cell, before carrying out the command procedure from P-Cell. As such, there will be a momentary MBMS reception from both the P-Cell and the non-primary cell. As a result, the same packet will be received more than once. The present method detects duplicate packets among the packets received from the first and the second RF terminals and correspondingly discards the duplicate packets. Once the second RF terminal is configured, reception of MBMS is continued from the non-primary cell. The method includes determining that the characteristics of the signal received through the first RF terminal are greater than a pre-determined threshold associated with the characteristics of the signal.

Once the command procedure through the first RF terminal is completed, the present method decodes the system information block (SIB) and multicast control channel (MCCH) information. While decoding is being carried out through the first RF terminal, MBMS is received from the non-primary cell through the second RF terminal. The present method further determines whether the services configured for the P-Cell are same as that of MBMS, currently being received from the non-primary cell. This allows the present method to determine whether reception of MBMS from the P-Cell using the first RF terminal may be resumed or not. If the services configured for the P-Cell are the same as that of MBMS currently being received from the non-primary cell, the present method allows resumption of MBMS reception from P-Cell through first RF terminal. In this scenario, the non-primary cell is de-configured. However, before resuming MBMS from the P-Cell through the first RF terminal, the characteristics of the signal received through the first RF terminal are determined. If the characteristics of the received signal exceeds a pre-defined threshold associated with the characteristics of the signal, MBMS reception is re-initiated from the P-Cell through the first RF terminal, otherwise MBMS reception is continued from the non-primary cell through the second RF terminal. If services configured for the P-Cell are not the same as that of MBMS, the reception of MBMS also continues from the non-primary cell through the second RF terminal.

According to embodiment of the present disclosure, the UE includes an RF management unit, which manages transmission/reception of various services through the first and second RF terminals. When the command is received by the UE during MBMS reception, the RF management unit allows the second RF terminal to be configured with P-Cell parameters. This allows restoration of MBMS from the non-primary cell, through the second RF terminal. The RF management unit allows the command procedure to be executed from the P-Cell through the first RF terminal. The RF management unit allows execution of the command procedure only when the second RF terminal has been configured and MBMS reception is initiated. As such, MBMS reception is temporarily carried out through both RF terminals.

After completion of the command procedure, the RF management unit resumes MBMS reception through the first RF terminal by de-configuring the second RF terminal. The present method allows the RF management unit to perform this functionality only after determining that the services configured for the P-Cell are the same as that of the non-primary cell, from which MBMS is currently being received.

The present method allows uninterrupted reception of MBMS, during arrival of mobile originating (MO) or mobile terminating (MT) CSFB calls, using the second RF terminal. In an example scenario, a user may watch a public broadcast using LTE through the second RF terminal, while receiving a CSFB call through the first RF terminal. The present method allows seamless and glitch-free reception of MBMS through the second RF terminal, while DRX measurements, handover, redirection, cell selection/reselection, measurement gap, reception of public broadcast messages, and the like, are performed through the first RF terminal. The present method also provides a notification to the user, indicating transition from LTE to CSFB. The notification is provided by the modem of the UE, to the application used for providing MBMS. The application behavior is accordingly based on the LTE to CSFB transition information. The present method allows parallel reception of critical public safety information, broadcasted by the network during emergencies. The present method avoids data loss and more importantly loss of MBMS scheduling information (MSI) which is provided only once during the scheduling period. The present method avoids loss of signaling information in MCCH which is exchanged during measurement gap. During the measurement gap, the UE needs to perform signaling measurements of neighboring cells, and hence MBMS reception will be interrupted, which may lead to glitches in reception and degradation of the overall user experience. The present method provides glitch-free/jitter-free user experience.

According to embodiment of the present disclosure, a method is provided for seamless reception of MBMS in a UE, having a single RF terminal. The method includes receiving MBMS from a P-cell, through a RF terminal in the UE, receiving a CSFB command through the RF terminal, while receiving the MBMS, de-configuring the MBMS, being received through the RF terminal and initiating the CSFB procedure, determining that MBMS commands are received from an application interface in the UE, processing the stored MBMS commands after completion of the CSFB procedure and resuming the MBMS on the P-Cell.

According to embodiment of the present disclosure, the present method allows restoration of MBMS after the completion of a CSFB command procedure. Considering the scenario in which a CSFB command arrives while MBMS is being received, the present method de-configures MBMS and initiates a CSFB procedure. The present method allows determining if any MBMS command is received from an application interface, used for reception of MBMS. If an MBMS command is received, it is stored in a queue. The present method allows maintaining and updating the status of the MBMS commands, received during the execution of the CSFB procedure allowing processing of the latest/updated MBMS commands after termination of the CSFB procedure. Once the CSFB procedure is terminated, the MBMS commands are retrieved from the queue and processed. After the processing of MBMS commands, the reception of MBMS is continued.

The present method allows storage of MBMS commands received from the application, used for decoding MBMS in the UE, through an application interface during the CSFB procedure. The present method allows execution of the stored latest/updated commands once the LTE stack is re-initialized after the termination of the CSFB procedure.

According to embodiment of the present disclosure, a method is provided for seamless reception of MBMS in a UE. The method includes receiving a command, indicating turning off transmission from the UE and allowing the user to seamlessly receive MBMS, even in situations in which, it is recommended to switch off the UE. The command also indicates turning off unicast reception from a network and enabling only broadcast reception from the network which is helpful in scenarios, in which a user desires to receive MBMS without receiving CSFB calls, text messages, e-mail messages, notifications, and the like. The method includes receiving the MBMS through an RF terminal.

According to embodiment of the present disclosure, the method provides user interfaces and user options which facilitate power saving, allow users to receive MBMS without receiving CSFB calls, messages, notifications, and the like. The present method allows reception of MBMS by configuring the UE to receive MBMS only broadcast services. In an example scenario, considering UE is in flight mode. Initially, the present method determines whether the UE is in flight mode or not. If the UE is in flight mode, normally a command is received by enabling flight mode by a user, which turns off transmission/reception by the UE. As a result, broadcast/multicast reception is prevented. However, the present method allows only the receiver of the UE to be switched on even if the UE is in flight mode. This provides seamless reception of MBMS through the RF terminal of the UE. The present method also allows reception of critical public safety services during flight mode. Some of the critical communications services are earthquake tsunami warning system (ETWS), cell broadcast, mission critical push to talk (MC-PTT), group communication system enabler (GCSE) as well as vehicular communication messaging like cooperative awareness message (CAM), decentralized environmental notification message (DENM), and the like.

Referring now to the drawings and more particularly to FIGS. 1 through 8C, where similar reference characters denote corresponding features consistently throughout the figures, there are shown preferred embodiments.

FIG. 1 is a flowchart depicting a method of providing seamless reception of MBMS in a UE having multiple RF terminals, according to an embodiment of the present disclosure.

At step 102, the method includes receiving MBMS from a P-Cell, through a first RF terminal in the UE. Initially the present method allows the user to access MBMS using the UE from the P-Cell, through the first RF terminal. The first RF terminal allows reception of MBMS through different types of air interfaces such as multicast-broadcast single-frequency network (MBSFN), single cell point to multipoint (SC-PTM), LTE, device to device (D2D), wireless local area network (WLAN), Bluetooth, and the like. The content received using MBMS may include broadcast or multicast services such as sporting events, musical events, television shows, and the like. MBMS may be used to deliver content pertaining to one of the services such as group communication system enabler (GCSE), mission critical push to talk (MC-PTT), public safety service, infotainment service, vehicular communication, and the like.

At step 104, the method includes receiving a command through the first RF terminal while receiving the MBMS. While the MBMS services are being accessed by the UE, a command is received from the P-Cell through the first RF terminal. In an example scenario, the command may be a CSFB call, incoming message or notification, mobility command, measurement gap, DRX command, cell selection/reselection, broadcast of critical messages related to public safety, and the like causing interruption in the reception of MBMS, through the first RF terminal. The present method overcomes this scenario by allowing seamless reception of MBMS from a non-primary cell (secondary cell or non-serving cell), by utilizing the second RF terminal of the UE.

At step 106, the method includes configuring the MBMS on the second RF terminal to continue receiving the MBMS from the non-primary cell. The present method configures the second RF terminal with the P-Cell parameters, used for decoding MBMS. The parameters were initially broadcasted by the network and received by the UE, from the P-Cell through the first RF terminal. The second RF terminal is configured with the P-Cell parameters, in response to the reception of the command. Once the second RF terminal is configured, there is seamless reception of MBMS. However, before executing the command procedure from the P-Cell, through the first RF terminal, the present method ensures that MBMS resumption is initiated from the non-primary cell through the second RF terminal. During the interval when the second RF terminal is configured with P-Cell parameters, MBMS reception is continued from the P-Cell through the first RF terminal. As a result, for a certain duration, multiple copies of the same packet will be received from both the first and second RF terminals respectively. The present method discards the duplicate versions of such packets. Afterwards, the command procedure is performed on the P-Cell through the first RF terminal in the UE.

After the command procedure is completed, the present method decodes the SIB and MCCH information. During the decoding procedure through the first RF terminal, MBMS is received from the non-primary cell through the second RF terminal. In order to resume MBMS from P-Cell using the first RF terminal, it is necessary to determine whether the services configured for the P-Cell are the same as that of MBMS, which is currently being received from the non-primary cell. If the services configured for the P-Cell are the same as that of MBMS, MBMS reception is resumed from the P-Cell, through the first RF terminal. As such, the non-primary cell is de-configured. If services configured for the P-Cell are not the same as that of MBMS, the reception of MBMS is continued from the non-primary cell.

The present method also determines the characteristics of the signal, being received from the P-Cell, before resuming the reception of MBMS from the P-Cell, through the first RF terminal. If the characteristics of the signal such as signal strength and signal quality, received from the P-Cell, is above a pre-defined threshold, the MBMS reception from the P-Cell is resumed. Otherwise, the MBMS reception is continued from the non-primary cell through the second RF terminal.

The various actions, acts, blocks, steps, and the like in the method of FIG. 1 may be performed in the order presented, in a different order or simultaneously. Further, in some embodiments, some of the actions, acts, blocks, steps, and the like may be omitted, added, modified, skipped, and the like without departing from the scope of the disclosure. The method and other descriptions provide a basis for a control program, which may be implemented by a microcontroller, microprocessor, or a combination thereof.

Figure 2:
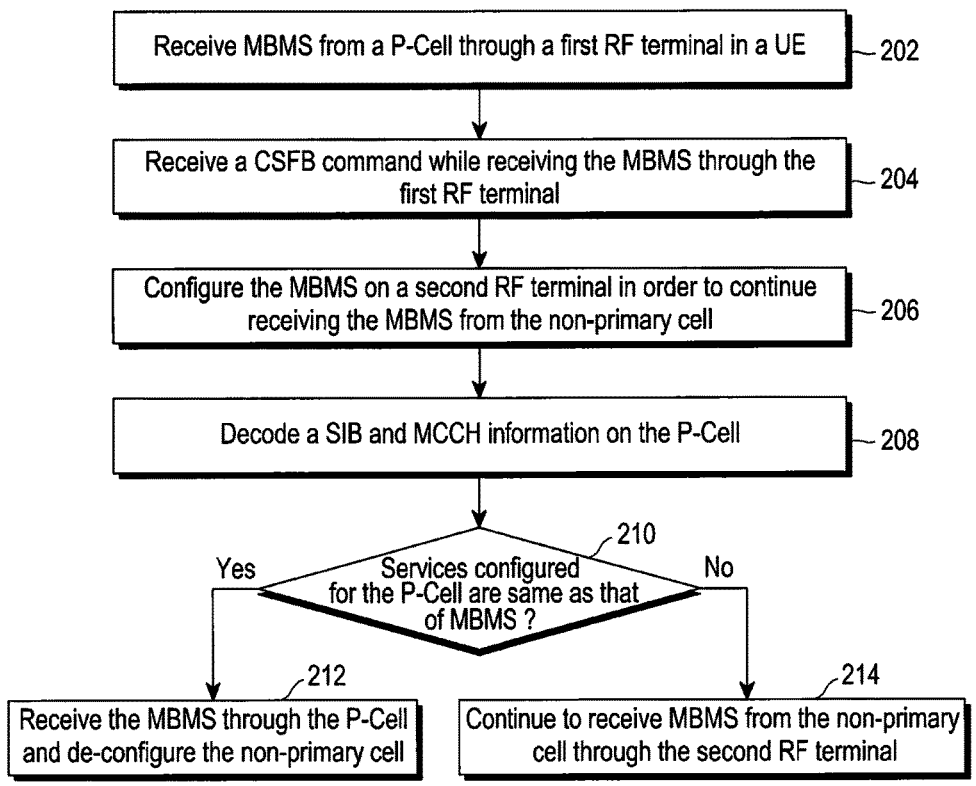
FIG. 2 is a flowchart depicting a method of providing seamless reception of MBMS in the UE, during mobile originating or mobile terminating (MO/MT) CSFB call, according to an embodiment of the present disclosure.

FIG. 2 is a flowchart depicting a method of providing seamless reception of MBMS in the UE, during mobile originating or mobile terminating (MO/MT) call of a CSFB call, according to an embodiment of the present disclosure.

At step 202, the method includes receiving MBMS from the P-Cell, through the first RF terminal in the UE. Initially, the present method allows the user to access MBMS using the UE from the P-Cell, through the first RF terminal.

At step 204, the method includes receiving a CSFB call, while receiving the MBMS through the first RF terminal. The MO/MT of CSFB call causes interruption in reception of MBMS.

At step 206, the method includes configuring the MBMS on the second RF terminal in order to continue receiving the MBMS from the non-primary cell, while CSFB call is carried out through the P-Cell.

The process of configuring MBMS on the second RF terminal is similar to step 106 of the method of FIG. 1, with the exception of the command being a MO/MT CSFB call.

When the CSFB call is received, the second RF terminal is configured with P-Cell parameters, in order to decode MBMS from the non-primary cell. The UE switches to either a 2G/3G network from the LTE network to initiate the CSFB call from the P-Cell through the first RF terminal. In an example scenario, considering a user is viewing a sporting event using MBMS, when the CSFB call arrives the user is provided a notification to either receive or reject the call. As such, the reception of the sporting event is interrupted degrading the user experience. The present method overcomes this scenario by allowing the user to view the sporting event seamlessly from the non-primary cell, through the second RF terminal, while providing an option to the user to either accept or reject the CSFB call from the P-Cell through the first RF terminal.

If the user desires to accept the CSFB call, the MBMS is received from the non-primary cell by configuring the second RF terminal with P-Cell parameters. Once the configuration is performed, MBMS reception is initiated from the non-primary cell. The CSFB call is then received from the P-Cell, through the first RF terminal while MBMS reception is continued during the interval, in which the non-primary cell is configured with P-Cell parameters. Further, being configured with P-Cell parameters, MBMS reception is initiated from the non-primary cell. Once MBMS reception is initiated from the non-primary cell, the CSFB call is initiated from the P-Cell preventing packet loss, which could have resulted if the CSFB call is initiated from the P-Cell before the configuration of the non-primary cell, with P-Cell parameters. However, multiple versions of packets pertaining to MBMS will be received. The present method will discard the duplicate packets received through both the first and second RF terminal respectively.

At step 208, the present method includes decoding SIB and MCCH information on the P-Cell. After completion of the CSFB call, the decoding is performed on the P-Cell. During the decoding procedure on the P-Cell, through the first RF terminal, MBMS reception is still continued from the non-primary cell, through the second RF terminal.

At step 210, the present method includes determining whether services configured for the P-Cell are same as that of MBMS, being currently received from the non-primary cell. In order to resume MBMS from P-Cell, using the first RF terminal, it is necessary to determine whether the services configured for the P-Cell are same as that of MBMS, being currently received from the non-primary cell, through the second RF terminal.

At step 212, the present method includes receiving the MBMS through the P-Cell and de-configuring the non-primary cell. If the services configured for the P-Cell are same as that of MBMS, MBMS reception is resumed from the P-Cell through the first RF terminal. As such, the non-primary cell is de-configured. The present method also determines the characteristics of the signal, being received from the P-Cell, before resuming the reception of MBMS from the P-Cell. If the characteristics of the signal received from the P-Cell is above a pre-defined threshold, associated with the characteristics of the signal, MBMS reception from the P-Cell is resumed.

In an example, the characteristic of the signal is signal strength and the predefined threshold is 16 dB. If the characteristic of the signal is greater than 16 dB, then the MBMS reception is resumed from the P-Cell. Otherwise, the MBMS reception continues from the non-primary cell.

At step 214, the present method includes receiving the MBMS from the non-primary cell through the second RF terminal. If services configured for the P-Cell are not the same as that of MBMS, the reception of MBMS is continued from the non-primary cell. If the characteristics of the signal received from the non-primary cell is above a pre-defined threshold, associated with the characteristics of the signal, the MBMS reception is continued from the non-primary cell, through the second RF terminal.

The various actions, acts, blocks, steps, and the like in the method of FIG. 2 may be performed in the order presented, in a different order or simultaneously. Further, in some embodiments, some of the actions, acts, blocks, steps, and the like may be omitted, added, modified, skipped, and the like without departing from the scope of the disclosure. The method and other descriptions provide a basis for a control program, which may be implemented by a microcontroller, microprocessor, or a combination thereof.

Figure 3:
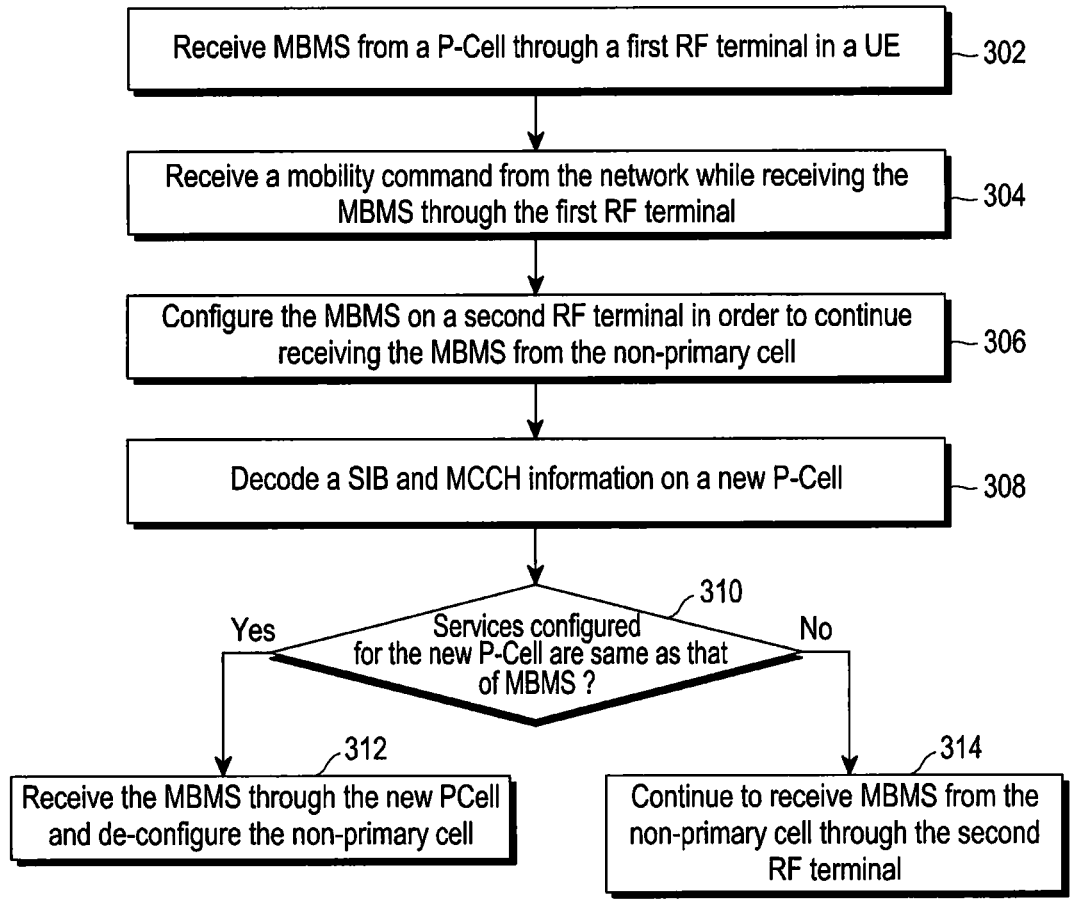
FIG. 3 is a flowchart depicting a method of providing seamless reception of MBMS in the UE, upon reception of a mobility command, according to an embodiment of the present disclosure.

FIG. 3 is a flowchart depicting a method of providing seamless reception of MBMS in the UE, upon reception of a mobility command, according to an embodiment of the present disclosure.

At step 302, the method includes receiving MBMS from the P-Cell, through the first RF terminal in the UE. Initially a user may access MBMS using the UE through the first RF terminal.

At step 304, the method includes receiving a mobility command from the network, while receiving the MBMS through the first RF terminal. The reception of the mobility command causes interruption in reception of MBMS.

At step 306, the method includes configuring the MBMS on the second RF terminal in order to continue receiving the MBMS from a non-primary cell, while the mobility command is carried out through the P-Cell.

The process of configuring MBMS on a second RF terminal is similar to step 106 of the method of FIG. 1, with the exception of receiving a mobility command.

When the mobility command is received, the second RF terminal is configured with current P-Cell parameters, in order to decode MBMS. Considering a scenario in which the UE is camped in a P-Cell, while receiving MBMS through the first RF terminal, the UE periodically determines the characteristics of the signal such as signal power, signal quality, and the like, received from the P-Cell and from a target cell. The signal characteristics of both the P-Cell and the target cell are then reported to the network to which the UE is connected allowing the network to determine whether a handover from the current cell to the target cell is required or not. The determination is based on the signal characteristics reported by the UE to the network. However, no transmission or reception is allowed during the interval (measurement gap), in which the UE determines the signal characteristics and reports to the network. As such, the MBMS reception is interrupted degrading the user experience.

Considering the same scenario above, it is assumed that the UE is mobile and arrives at a boundary between two cells. As such, the network instructs the UE to perform a handover (UE receives a handover command), since the signal received from the P-Cell, in which the UE is currently camped is of poor quality. The handover procedure involves an exchange of signaling information between the UE and network. Thus, MBMS reception is interrupted during the interval in which handover is performed.

When the mobility command (handover) is executed, the present method allows MBMS reception from the non-primary cell by configuring the second RF terminal with the P-Cell parameters. Once the configuration is performed, MBMS reception is initiated from the non-primary cell. Thus, seamless reception of MBMS is provided to the user. Thereafter a mobility command is executed from the P-Cell through the first RF terminal.

At step 308, the present method includes decoding SIB and MCCH information on a new P-Cell. Once the mobility command is executed, the present method decodes the SIB and MCCH information on the new P-Cell. The new P-Cell is the cell in which the UE is camped after handover. During the decoding procedure on the new P-Cell through the first RF terminal, MBMS reception is continued from the non-primary cell, through the second RF terminal.

At step 310, the present method includes determining whether services configured for the new P-Cell are same as that of MBMS currently being received from the non-primary cell. In order to resume MBMS from the new P-Cell using the first RF terminal, it is necessary to determine whether the services configured for the new P-Cell are same as that of MBMS being received from the non-primary cell through the second RF terminal.

At step 312, the present method includes receiving the MBMS through the new P-Cell and de-configuring the non-primary cell. If the services configured for the P-Cell are the same as that of MBMS, MBMS reception is resumed from the new P-Cell through the first RF terminal. As such, the non-primary cell is de-configured. The present method also determines the characteristics of the signal being received from the new P-Cell before resuming the reception of MBMS from the P-Cell. If the characteristics of the signal received from the new P-Cell are above a pre-defined threshold, associated with the characteristics of the signal, MBMS reception from new P-Cell is resumed.

At step 314, the present method includes receiving the MBMS from the non-primary cell, through the second RF terminal. If services configured for the new P-Cell are not same as that of MBMS, the reception of MBMS is continued from the non-primary cell and the new P-Cell is configured to provide new services to the user.

The various actions, acts, blocks, steps, and the like in the method of FIG. 3 may be performed in the order presented, in a different order or simultaneously. Further, in some embodiments, some of the actions, acts, blocks, steps, and the like may be omitted, added, modified, skipped, and the like without departing from the scope of the disclosure. The method and other descriptions provide a basis for a control program, which may be easily implemented by a microcontroller, microprocessor, or a combination thereof.

Figure 4:
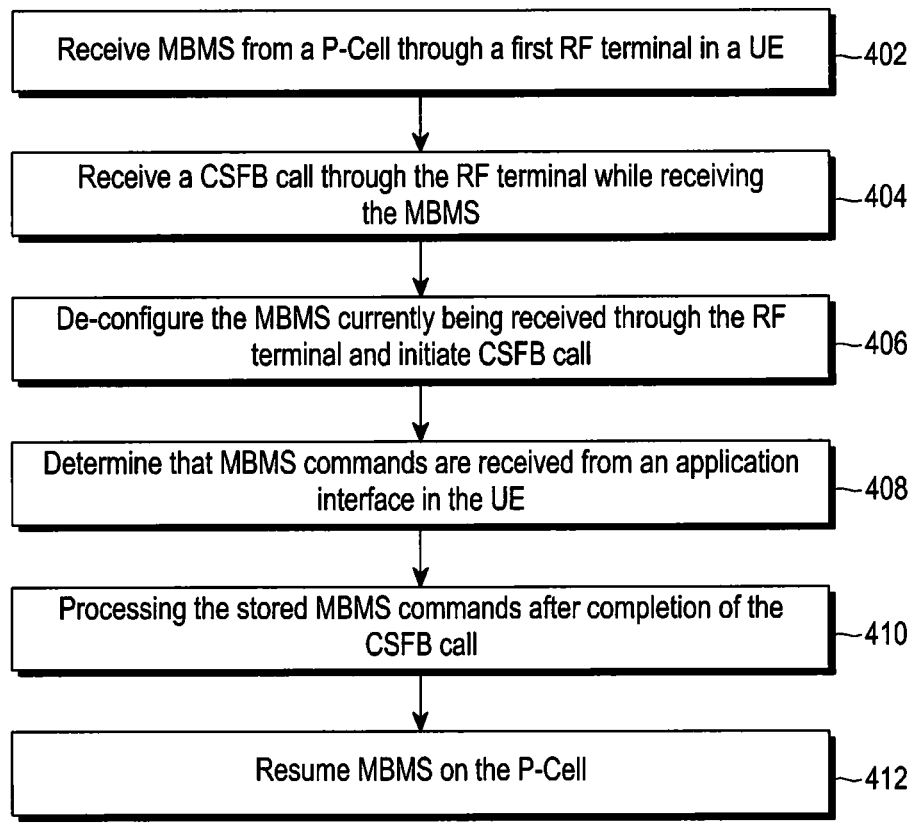
FIG. 4 is a flowchart depicting a method of providing recovery of MBMS commands during execution of CSFB call, according to an embodiment of the present disclosure.

FIG. 4 is a flowchart depicting a method of providing recovery of MBMS commands during execution of a CSFB call, according to an embodiment of the present disclosure.

The present method allows restoration of MBMS services after the completion of a CSFB call. This method is applicable to scenarios in which the UE consists of a single RF terminal.

At step 402, the present method includes receiving MBMS from a P-Cell through the RF terminal in the UE.

At step 404, the present method includes receiving a CSFB call through the RF terminal, while receiving the MBMS.

At step 406, the present method includes de-configuring the MBMS currently being received through the RF terminal and initiating a CSFB call. The UE switches to a 2G/3G network from a LTE network to initiate the CSFB call from the P-Cell, through the RF terminal.

At step 408, the present method includes determining that MBMS commands are received from an application interface in the UE. The UE frequently monitors whether the application interface receives an MBMS command during the CSFB call. If an MBMS command is received during the CSFB call, it is stored in a queue. The present method allows maintaining and updating the status of the MBMS commands received during the execution of the CSFB call assisting in processing the latest/updated MBMS commands after termination of the CSFB call. Once the CSFB call is completed, SIB and MCCH information on P-Cell is decoded by the UE.

At step 410, the present method includes processing the stored MBMS commands after completion of the CSFB call. Once the CSFB call is terminated, the latest and updated MBMS commands are retrieved from the queue and processed.

At step 412, the present method includes resuming MBMS on the P-Cell. After the processing of MBMS commands, the reception of MBMS is continued from the P-Cell, through the RF terminal.

The various actions, acts, blocks, steps, and the like in the method of FIG. 4 may be performed in the order presented, in a different order or simultaneously. Further, in some embodiments, some of the actions, acts, blocks, steps, and the like may be omitted, added, modified, skipped, and the like without departing from the scope of the disclosure. The method and other descriptions provide a basis for a control program, which may be easily implemented by a microcontroller, microprocessor, or a combination thereof.

Figure 5:
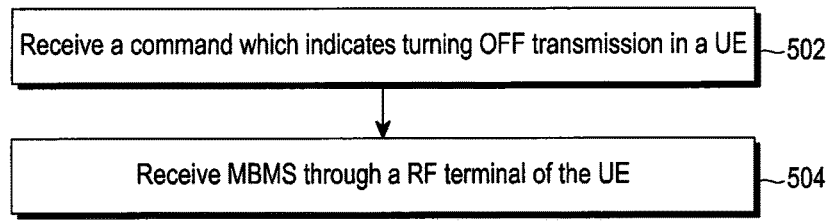
FIG. 5 is a flowchart depicting a method of providing seamless reception of MBMS in a UE, according to an embodiment of the present disclosure.

FIG. 5 is a flowchart depicting a method of providing seamless reception of MBMS in the UE, according to the an embodiment of the present disclosure.

At step 502, the present method includes receiving a command which indicates turning off transmission in the UE. When this command is received by the UE, it turns off all transmissions. However, reception is still enabled. Thus, it is possible to have continuous broadcast reception facilitating in reducing the power consumption of the UE.

At step 504, the present method includes receiving MBMS through the RF terminal of the UE. Since broadcast reception is enabled, the user is able to receive MBMS seamlessly through UE. The present method allows MBMS reception by the UE, in circumstances in which all LTE functionality is suspended allowing reception of critical messages broadcast by the network during natural calamities or disasters.

The various actions, acts, blocks, steps, and the like in the method of FIG. 5 may be performed in the order presented, in a different order or simultaneously. Further, in some embodiments, some of the actions, acts, blocks, steps, and the like may be omitted, added, modified, skipped, and the like without departing from the scope of the disclosure. The method and other descriptions provide a basis for a control program, which may be easily implemented by a microcontroller, microprocessor, or a combination thereof.

Figure 6:
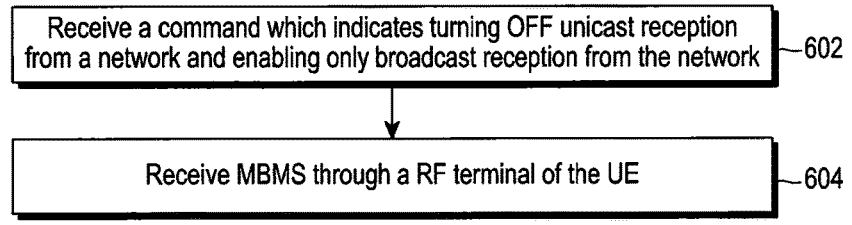
FIG. 6 is a flowchart depicting a method of providing seamless reception of MBMS in a UE, according to another embodiment of the present disclosure.

FIG. 6 is a flowchart depicting a method of providing seamless reception of MBMS in the UE, according to an embodiment of the present disclosure.

At step 602, the present method includes receiving a command which indicates turning off unicast reception from a network and enabling only broadcast reception from the network. The present method allows a user to switch the UE to a broadcast infotainment mode wherein transmission and/or reception for cellular link/service are not sent and/or received.

In an embodiment of the present disclosure, the UE notifies the network when it is transitioning to and/or from the broadcast only mode. This information may be utilized by the network to inform the callers that the UE is in broadcast only mode, and is unable to receive/accept calls.

In an embodiment of the present disclosure, a notification is provided to those callers when the UE switches to unicast reception mode. This facilitates the callers to be updated about the status of the UE.

At step 604, the present method includes receiving MBMS through the RF terminal of the UE. Since all transmission and/or reception for cellular link/service is suspended, the user is able to receive MBMS without any form of disturbances such as calls, messages, e-mails, notifications, and the like allowing power efficient reception of MBMS or broadcast services, in comparison with reception of broadcast services along with all unicast receptions. In an example scenario, a user would be able to watch a complete movie, prior to exhaustion of the battery by utilizing this feature of the UE.

In another embodiment of the present disclosure, it is specified that during broadcast only mode or do not disturb mode, the UE allows reception of critical communication, public safety or emergency messages.

The various actions, acts, blocks, steps, and the like in the method of FIG. 6 may be performed in the order presented, in a different order or simultaneously. Further, in some embodiments, some of the actions, acts, blocks, steps, and the like may be omitted, added, modified, skipped, and the like without departing from the scope of the disclosure. The method and other descriptions provide a basis for a control program, which may be easily implemented by a microcontroller, microprocessor, or a combination thereof.

Figure 7A:
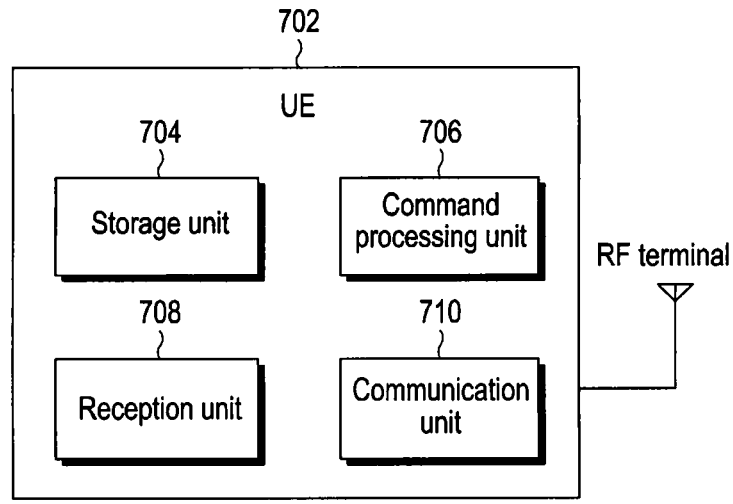
FIG. 7A illustrates various components of the UE, used for recovering MBMS commands during execution of CSFB procedure, according to an embodiment of the present disclosure.

FIG. 7A illustrates the various components of a UE 702, used for recovering MBMS commands during execution of a CSFB procedure, according to an embodiment of the present disclosure.

As depicted in FIG. 7A, the various components of the UE 702 consists of a storage unit 704, a command processing unit 706, a reception unit 708, and a communication unit 710.

The storage unit 704, in the UE 702, stores the MBMS commands, received from the application interface during the execution of a CSFB procedure. When a CSFB command is received through the RF terminal, MBMS reception from the P-Cell is interrupted. The CSFB procedure is initiated by de-configuring MBMS on the P-Cell. During the interval in which the CSFB procedure is executed, the storage unit 704 receives MBMS commands from the application interface and stores them. The storage unit 704 determines whether MBMS commands are received from the application interface in the UE 702. The storage unit 704 allows maintaining and updating the status of the MBMS commands received during the execution of the CSFB procedure assisting in processing the latest/updated MBMS commands, after termination of the CSFB procedure. These commands are later processed by the command processing unit 706.

The command processing unit 706 decodes SIB and MCCH information on the P-Cell once the CSFB procedure is completed. The command processing unit 706 retrieves the latest and updated MBMS commands from the storage unit 704. The command processing unit 706 executes the MBMS commands after completion of the CSFB procedure allowing restoration of MBMS services from the P-Cell through the RF terminal. The reception unit 708, in the UE 702, may be used to configure reception of either unicast or broadcast services from the network to which the UE 702 is connected.

The communication unit 710 allows reception of MBMS from the P-Cell through the RF terminal. When the CSFB command is received, the communication unit 710 allows the UE 702 to switch to either a 2G or 3G network in order to initiate the CSFB procedure from the P-Cell through the RF terminal. When the CSFB procedure is completed, MBMS reception is resumed through the RF terminal using P-Cell parameters.

Figure 7B:
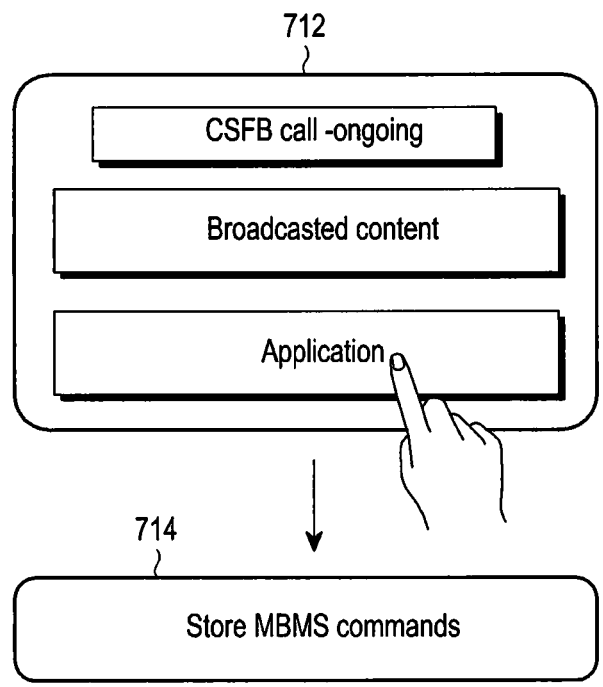
FIG. 7B illustrates a user interface of the UE, used for recovering MBMS commands during execution of CSFB procedure, according to an embodiment of the present disclosure.

FIG. 7B illustrates the user interface 712 of the UE 702, used for recovering MBMS commands during execution of a CSFB procedure, according to an embodiment of the present disclosure.

As depicted in FIG. 7B, during the execution of the CSFB procedure, MBMS commands 714 from the application interface are received and stored. The MBMS commands received during the execution of the CSFB procedure, are maintained and updated assisting in processing the latest/updated MBMS commands after termination of the CSFB procedure.

Figure 8A:
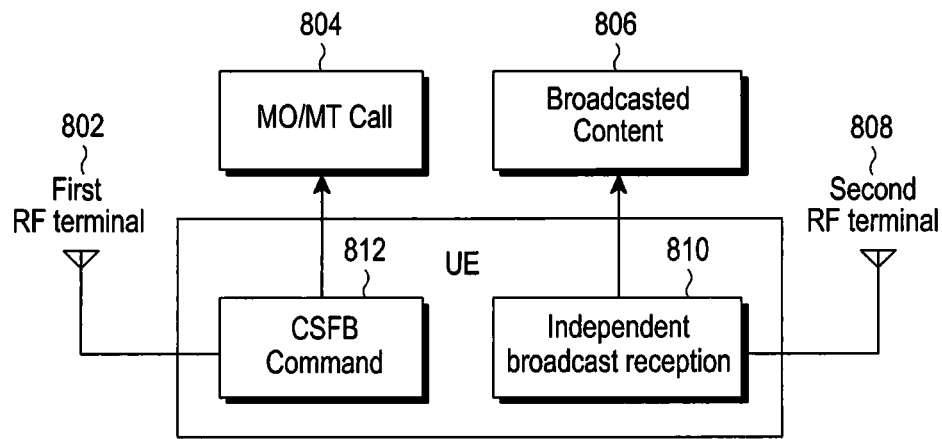
FIG. 8A illustrates an example scenario, in which a CSFB call is received through the first RF terminal, while receiving MBMS through the first RF terminal, according to an embodiment of the present disclosure.

FIG. 8A illustrates an example scenario, in which a CSFB call is received through the first RF terminal, while receiving MBMS through the first RF terminal, according to an embodiment of the present disclosure.

When a CSFB command 812 indicating the CSFB call, such as a MO/MT call 804 is received, the second RF terminal 808 is configured with P-Cell parameters, in order to decode MBMS from the non-primary cell. The UE switches to either a 2G or 3G network from an LTE network to initiate the CSFB call from the P-Cell through the first RF terminal 802. In an example scenario, considering a user is viewing a sporting event using MBMS, when the CSFB call arrives the user is provided with a notification to either receive or reject the call. As such, the reception of the sporting event is interrupted degrading the user experience. The present method overcomes this scenario by allowing the user to view the sporting event seamlessly from the non-primary cell, through the second RF terminal, while providing an option to the user to either accept or reject the CSFB call from the P-Cell through the first RF terminal.

If the user desires to accept the CSFB call, the MBMS is received from the non-primary cell by configuring the second RF terminal 808 with P-Cell parameters. Once the configuration is performed, MBMS reception is initiated from the non-primary cell. The UE receives broadcasted content 806 through an independent broadcast reception 810 configured by the second RF terminal 808. The CSFB call is then received from the P-Cell, through the first RF terminal 802.

Figure 8B:
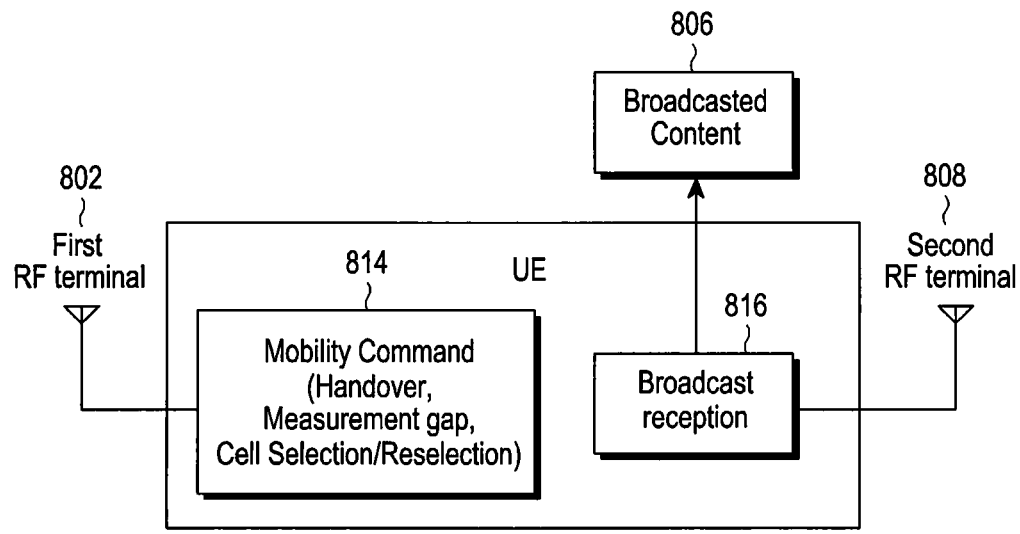
FIG. 8B illustrates an example scenario, in which a mobility command is received through the first RF terminal, while receiving MBMS through the first RF terminal, according an embodiment of the present disclosure.

FIG. 8B illustrates an example scenario, in which a mobility command is received through the first RF terminal, while receiving MBMS through the first RF terminal, according to an embodiment of the present disclosure.

Considering an example scenario, in which the UE is mobile and arrives at a boundary between two cells. As such, the network instructs the UE to perform a handover, since the signal received from the P-Cell, in which the UE is currently camped, is of poor quality. The handover procedure involves changing to a new cell, synchronization to the new cell and exchange of signaling information between the UE and network. Thus, MBMS reception is interrupted during the interval in which handover is performed.

When the mobility command 814 is executed, MBMS broadcast reception 816 of broadcasted content 806 is continued from the non-primary cell, by configuring the second RF terminal 808 with the P-Cell parameters. Once the configuration is performed, MBMS reception is initiated from the non-primary cell. Thus, seamless reception of MBMS is provided to the user. Thereafter mobility command is executed from the P-Cell through the first RF terminal 802.

Figure 8C:
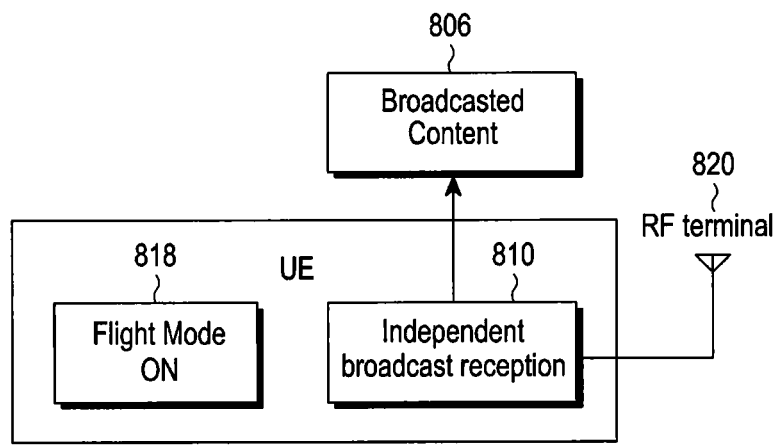
FIG. 8C illustrates an example scenario, in which there is seamless reception of MBMS by the UE in flight mode, according to an embodiment of the present disclosure.

FIG. 8C illustrates an example scenario, in which there is seamless reception of MBMS by the UE in flight mode, according to an embodiment of the present disclosure As depicted in FIG. 8C, considering UE is in flight mode. If the UE is in flight mode a command is received by the UE, wherein a user triggers the flight mode on 818, which turns off transmission/reception by the UE. As a result, broadcast/multicast reception of broadcasted content 806 is prevented. However, the receiver of the UE will be switched on even if the UE is in flight mode providing seamless reception of MBMS through the RF terminal 820 of the UE reducing the power consumption of the UE.

The embodiments disclosed herein may be implemented through at least one software program running on at least one hardware device and performing network management functions to control the elements. The elements shown in the FIGS. 1 through 8C include blocks which may be at least one of a hardware device, or a combination of hardware device and software module.

The foregoing description of the specific embodiments reveal the general nature of the embodiments herein that others may, by applying current knowledge, readily modify and/or adapt for various applications of such specific embodiments without departing from the generic concept, and therefore, such adaptations and modifications are within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the embodiments of the present disclosure as defined by the appended claims and their equivalents.

What is claimed is:

1. A method of providing seamless reception of multimedia broadcast multicast services (MBMS) in a user equipment (UE) having multiple radio frequency (RF) terminals, the method comprising:
   receiving MBMS from a primary cell (P-Cell), through a first RF terminal in the UE;
   receiving a command through the first RF terminal while receiving the MBMS;
   in response to receiving the command through the first RF terminal, configuring the MBMS on a second RF terminal by configuring the second RF terminal with P-Cell parameters used for receiving the MBMS through the first RF terminal; and
   initiating reception of the MBMS from a non-primary cell through the second RF terminal that is configured with the P-Cell parameters used for receiving the MBMS through the first RF terminal,
   wherein the non-primary cell includes at least one of a secondary cell and a non-serving cell.

2. The method of claim 1, wherein configuring the MBMS on the second RF terminal in the UE includes:
   configuring the second RF terminal with P-Cell parameters in response to receiving a circuit switched fallback (CSFB) command; and
   performing a CSFB procedure from the P-Cell through the first RF terminal in the UE.

3. The method of claim 2, further comprising:
   decoding a system information block (SIB) and an MBMS control channel (MCCH) information on the P-Cell after completion of the CSFB procedure;
   determining whether services configured for the P-Cell are the same as those of the MBMS being received from the non-primary cell through the second RF terminal; and
   receiving the MBMS through the P-Cell and de-configuring the non-primary cell in response to determining that the services configured for the P-Cell are the same as those of the MBMS being received from the non-primary cell.

4. The method of claim 3, further comprising:
   continuing to receive the MBMS from the non-primary cell through the second RF terminal in response to determining that the services configured for the P-Cell are different from those of the MBMS being received from the non-primary cell.

5. The method of claim 1, wherein configuring the MBMS on the second RF terminal in the UE includes:
   configuring the second RF terminal with P-Cell parameters in response to receiving a mobility command; and
   performing a mobility procedure from the P-Cell, through the first RF terminal in the UE.

6. The method of claim 5, further comprising:
   decoding a system information block (SIB) and an MBMS control channel (MCCH) information on the P-Cell after the completion of the mobility procedure through the first RF terminal;

determining whether services configured for the P-Cell are the same as those of the MBMS being received from the non-primary cell through the second RF terminal; and receiving MBMS through the P-Cell and de-configuring the non-primary cell in response to determining that the services configured for the P-Cell are the same as those of the MBMS being received from the non-primary cell.

7. The method of claim 6, further comprising:

continuing to receive the MBMS from the non-primary cell through the second RF terminal in response to determining that the services configured for the P-Cell are different from those of the MBMS being received from the non-primary cell.

8. The method of claim 1, wherein the MBMS is configured on the second RF terminal in the UE during a measurement gap.

9. The method of claim 1, wherein configuring the MBMS on the second RF terminal to continue receiving the MBMS from the non-primary cell includes:

initiating transition from the first RF terminal to the second RF terminal;

receiving packets through the first RF terminal and the second RF terminal during the transition;

determining duplicate packets received through the first RF terminal and the second RF terminal after the transition; and deleting the duplicate packets.

10. The method of claim 3, wherein receiving the MBMS from the P-Cell through the first RF terminal and de-configuring the non-primary cell includes determining that the characteristics of the signal received through the first RF terminal are greater than a pre-determined threshold.

11. The method of claim 4, wherein continuing to receive the MBMS from the non-primary cell through the second RF terminal includes determining that the characteristics of the signal received through the second RF terminal are greater than a pre-determined threshold.

12. A method of providing seamless reception of multimedia broadcast multicast services (MBMS) in a user equipment (UE), the method comprising:

receiving MBMS from a primary cell (P-Cell), using a first radio frequency (RF) terminal in the UE;

receiving a circuit switched fallback (CSFB) command through the first RF terminal while receiving the MBMS;

configuring a second RF terminal with P-Cell parameters used for receiving the MBMS through the first RF terminal;

initiating reception of the MBMS through the second RF terminal that is configured with the P-Cell parameters used for receiving the MBMS through the first RF terminal;

de-configuring the MBMS being received through the first RF terminal and initiating a CSFB procedure;

determining that MBMS commands are received from an application interface in the UE;

processing the MBMS commands after completion of the CSFB procedure through the first RF terminal; and resuming MBMS from the P-Cell through the first RF terminal.

13. A user equipment (UE), comprising:

memory; and processor configured to: receive multimedia broadcast multicast services (MBMS) from a primary cell (P-Cell) through a first RF terminal;

receive a command through the first RF terminal while receiving the MBMS;

in response to receiving the command through the first RF terminal, configure the MBMS on a second RF terminal by configuring the second RF terminal with P-Cell parameters used for receiving the MBMS through the first RF terminal; and initiate reception of the MBMS through the second RF terminal that is configured with the P-Cell parameters used for receiving the MBMS through the first RF terminal to continue receiving the MBMS from a non-primary cell, wherein the non-primary cell includes at least one of a secondary cell and a non-serving cell.

14. The UE of claim 13, wherein configuring the MBMS service on the second RF terminal of the UE includes: configuring the second RF terminal with P-Cell parameters in response to receiving a circuit switched fallback (CSFB) command; and performing a CSFB procedure from the P-Cell through the first RF terminal in the UE, wherein the MBMS is configured on the second RF terminal of the UE during a measurement gap.

15. The UE of claim 14, wherein the UE is further configured to:

decode a system information block (SIB) and an MBMS control channel (MCCH) information on the P-Cell after completion of the CSFB procedure;

determine whether services configured for the P-Cell are the same as those of the MBMS being received from the non-primary cell through the second RF terminal; and receive the MBMS through the P-Cell and de-configuring the non-primary cell in response to determining that the services configured for the P-Cell are the same as those of the MBMS being received from the non-primary cell, and wherein receiving the MBMS from the P-Cell through the first RF terminal and de-configuring the non-primary cell includes determining that the characteristics of the signal received through the first RF terminal are greater than a pre-determined threshold.

16. The UE of claim 15, wherein the UE is further configured to:

continue receiving the MBMS from the non-primary cell through the second RF terminal in response to determining that the services configured for the P-Cell are different from those of the MBMS being received from the non-primary cell, and wherein continuing to receive the MBMS from the non-primary cell through the second RF terminal includes determining that the characteristics of the signal received through the second RF terminal are greater than a pre-determined threshold.

17. The UE of claim 13, wherein configuring the MBMS service on the second RF terminal includes:

configuring the second RF terminal with the P-Cell parameters in response to receiving a mobility command; and performing a mobility procedure from the P-Cell through the first RF terminal of the UE.

18. The UE of claim 17, wherein the UE is further configured to:

decode a system information block (SIB) and an MCCH information on a P-Cell after the completion of a mobility procedure through the first RF terminal;

determine whether services configured for the P-Cell are the same as those of the MBMS being received from the non-primary cell through the second RF terminal; and receive MBMS through the P-Cell and de-configuring the non-primary cell in response to determining that the services configured for the P-Cell are the same as those of the MBMS being received from the non-primary cell.

19. The UE of claim 18, wherein the UE is further configured to:

continue receiving the MBMS from the non-primary cell through the second RF terminal in response to determining that the services configured for the P-Cell are different from those of the MBMS being received from the non-primary cell.

20. The UE of claim 13, wherein configuring the MBMS on the second RF terminal to continue receiving the MBMS from the non-primary cell includes:

initiating a transition from the first RF terminal to the second RF terminal;

receiving packets through the first RF terminal and the second RF terminal during the transition;

determining duplicate packets received through the first RF terminal and the second RF terminal after the transition; and deleting the duplicate packets.

* * * * *